(12) United States Patent
Kanafani

(10) Patent No.: US 7,598,845 B2
(45) Date of Patent: Oct. 6, 2009

(54) TOWING LOAD DETECTION SYSTEM

(75) Inventor: Fadi S Kanafani, Windsor (CA)

(73) Assignee: Chrysler Group LLC, Auburn Hills, MI (US)

( * ) Notice: Subject to any disclaimer, the term of this patent is extended or adjusted under 35 U.S.C. 154(b) by 191 days.

(21) Appl. No.: 11/270,152

(22) Filed: Nov. 9, 2005

(65) Prior Publication Data
US 2007/0103280 A1 May 10, 2007

(51) Int. Cl.
*B60Q 1/00* (2006.01)
(52) U.S. Cl. ............... 340/425.5; 340/438; 340/440
(58) Field of Classification Search ............ 340/425.5, 340/431, 438, 440
See application file for complete search history.

(56) References Cited

U.S. PATENT DOCUMENTS

| | | | |
|---|---|---|---|
| 4,430,637 A | | 2/1984 | Koch-Ducker et al. |
| 4,658,676 A | * | 4/1987 | Furusawa et al. .......... 477/125 |
| 4,743,888 A | | 5/1988 | Hilpert et al. |
| 4,850,249 A | * | 7/1989 | Kirstein ..................... 477/97 |
| 5,153,586 A | * | 10/1992 | Fuller ...................... 340/932.2 |
| 5,693,985 A | | 12/1997 | Gee et al. |
| 5,905,433 A | * | 5/1999 | Wortham .................. 340/431 |
| 6,054,927 A | * | 4/2000 | Brickell ................... 340/573.1 |
| 6,264,337 B1 | * | 7/2001 | Rannells et al. .......... 359/843 |
| 6,268,803 B1 | * | 7/2001 | Gunderson et al. ......... 340/903 |
| 6,446,998 B1 | * | 9/2002 | Koenig et al. .............. 280/432 |
| 6,508,325 B1 | * | 1/2003 | Schwarz et al. ............ 180/167 |
| 6,587,041 B1 | * | 7/2003 | Brown, Jr. ................. 340/431 |
| 6,636,047 B2 | | 10/2003 | Arlt et al. |
| 6,668,225 B2 | * | 12/2003 | Oh et al. ..................... 701/70 |
| 6,676,561 B2 | * | 1/2004 | Fritzer et al. ................ 477/70 |
| 2005/0004732 A1 | * | 1/2005 | Berry et al. .................. 701/48 |
| 2005/0128059 A1 | * | 6/2005 | Vause ....................... 340/431 |
| 2005/0184859 A1 | * | 8/2005 | Li ............................. 340/435 |
| 2005/0203684 A1 | * | 9/2005 | Borgesson ................... 701/36 |
| 2006/0092003 A1 | * | 5/2006 | Gardner ..................... 340/431 |
| 2006/0184300 A1 | * | 8/2006 | Schubert et al. ............. 701/45 |
| 2006/0187008 A1 | * | 8/2006 | Yu ............................ 340/431 |

FOREIGN PATENT DOCUMENTS

EP 1571040 A2 * 9/2005
WO WO 03058359 A1 * 7/2003

* cited by examiner

*Primary Examiner*—Toan N Pham
*Assistant Examiner*—Kerri L McNally
(74) *Attorney, Agent, or Firm*—Ralph E. Smith

(57) ABSTRACT

A towing load detection system for detecting whether a vehicle is towing an object. The system includes a controller and at least one proximity sensor operable to detect the presence of the object being towed. The controller is operable to cause a vehicle effect when the proximity sensor detects that the vehicle is towing an object.

18 Claims, 2 Drawing Sheets

TOWING LOAD DETECTION SYSTEM

FIELD OF THE INVENTION

The present invention relates to a detection system and, more specifically, to a towing load detection system for a vehicle.

BACKGROUND OF THE INVENTION

It is known to provide an automatic towing load detection system in a vehicle. Some systems detect a tow load when the towed object is electrically connected to the vehicle through the brake light circuitry, license plate light circuitry, or otherwise. In other systems, road load sensing algorithms are utilized to calculate whether there is an increased load on the vehicle indicative of a towing load. When the towing load is detected, the vehicle can be automatically controlled. For instance, the transmission can be regulated so that more torque is available when climbing a hill and engine braking occurs when descending a hill.

One drawback is that some systems could be subject to user error, such as if the user fails to properly connect the tow load electrically to the vehicle. Furthermore, systems that utilize algorithms to calculate whether an object is being towed are typically unable to distinguish a towing load from a steep grade, a headwind, or other increased vehicle load. More specifically, when the vehicle climbs a steep grade, the system may misidentify the resultant load increase as a towing load. Likewise, the vehicle may misidentify a load caused by a stiff headwind as a towing load. In these cases, the system may automatically control the transmission or other vehicle system in an unwanted manner based on the misidentified load. Therefore, there remains a need for a towing load detection system that is less likely to be subject to user error and that is better capable of distinguishing between towing loads and other vehicle loads.

SUMMARY OF THE INVENTION

In response to the aforementioned needs, the present invention is a towing load detection system for detecting whether a vehicle is towing an object. The system includes a controller and at least one proximity sensor operable to detect the presence of the object being towed. The controller is operable to cause a vehicle effect when the proximity sensor detects that the vehicle is towing an object.

In another aspect, the present invention is a vehicle that includes a controller and at least one proximity sensor operable to detect the presence of an object being towed by the vehicle. The controller is operable to cause a vehicle effect when the proximity sensor detects the object being towed.

In a further aspect, the present invention is a method of detecting whether a vehicle is towing an object. The method includes the steps of detecting with at least one proximity sensor whether the vehicle is towing an object. The method also includes causing a vehicle effect when the proximity sensor detects that the vehicle is towing the object.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a flowchart demonstrating the steps of operation for the towing load detection system of the present invention.

DETAILED DESCRIPTION OF THE PREFERRED EMBODIMENTS

The following description of the preferred embodiment is merely exemplary in nature and is in no way intended to limit the invention, its application, or uses.

Figure 1:
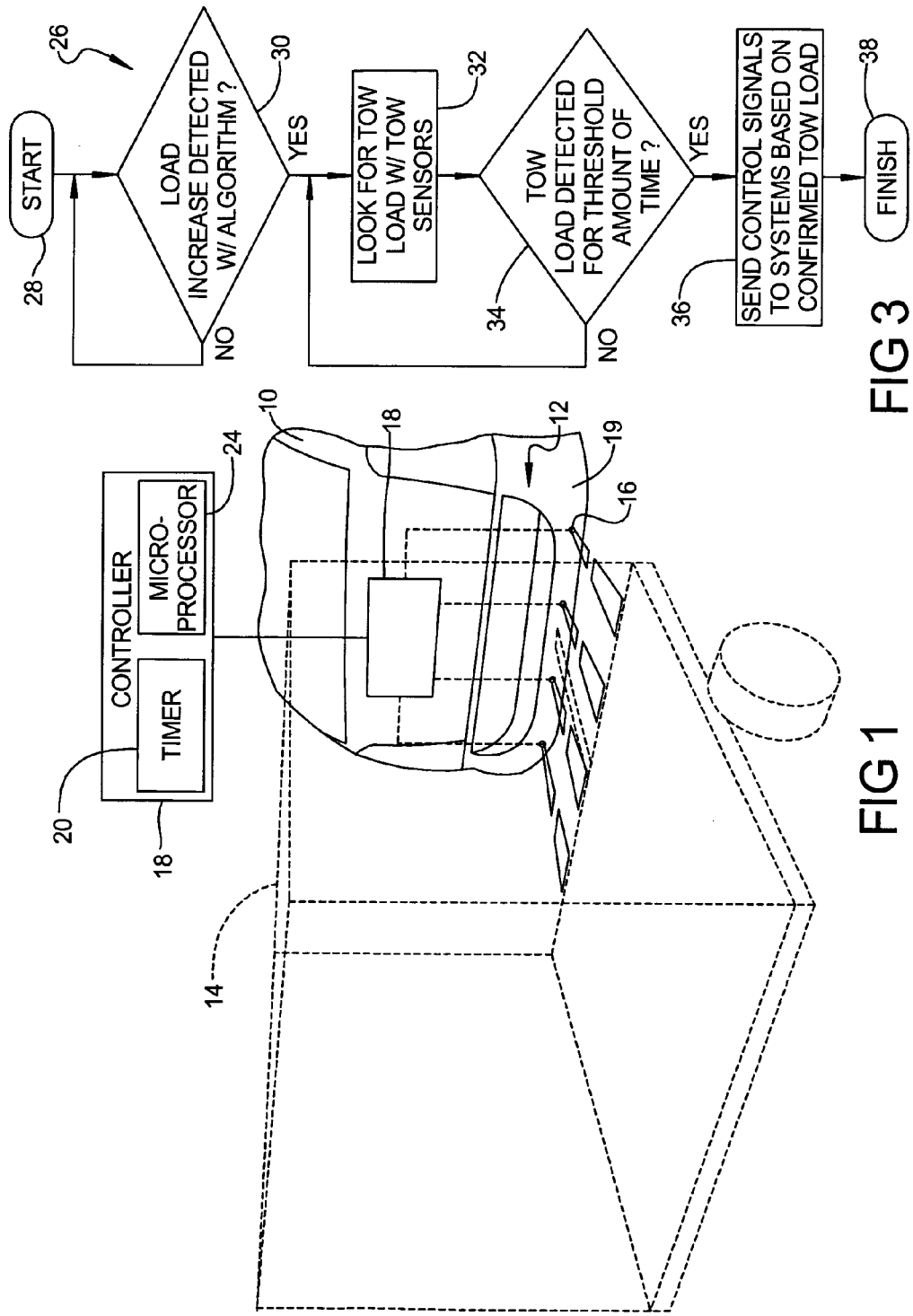
FIG. 1 is a perspective view of a vehicle with an object being towed constructed according to the teachings of the present invention.
Figure 2:
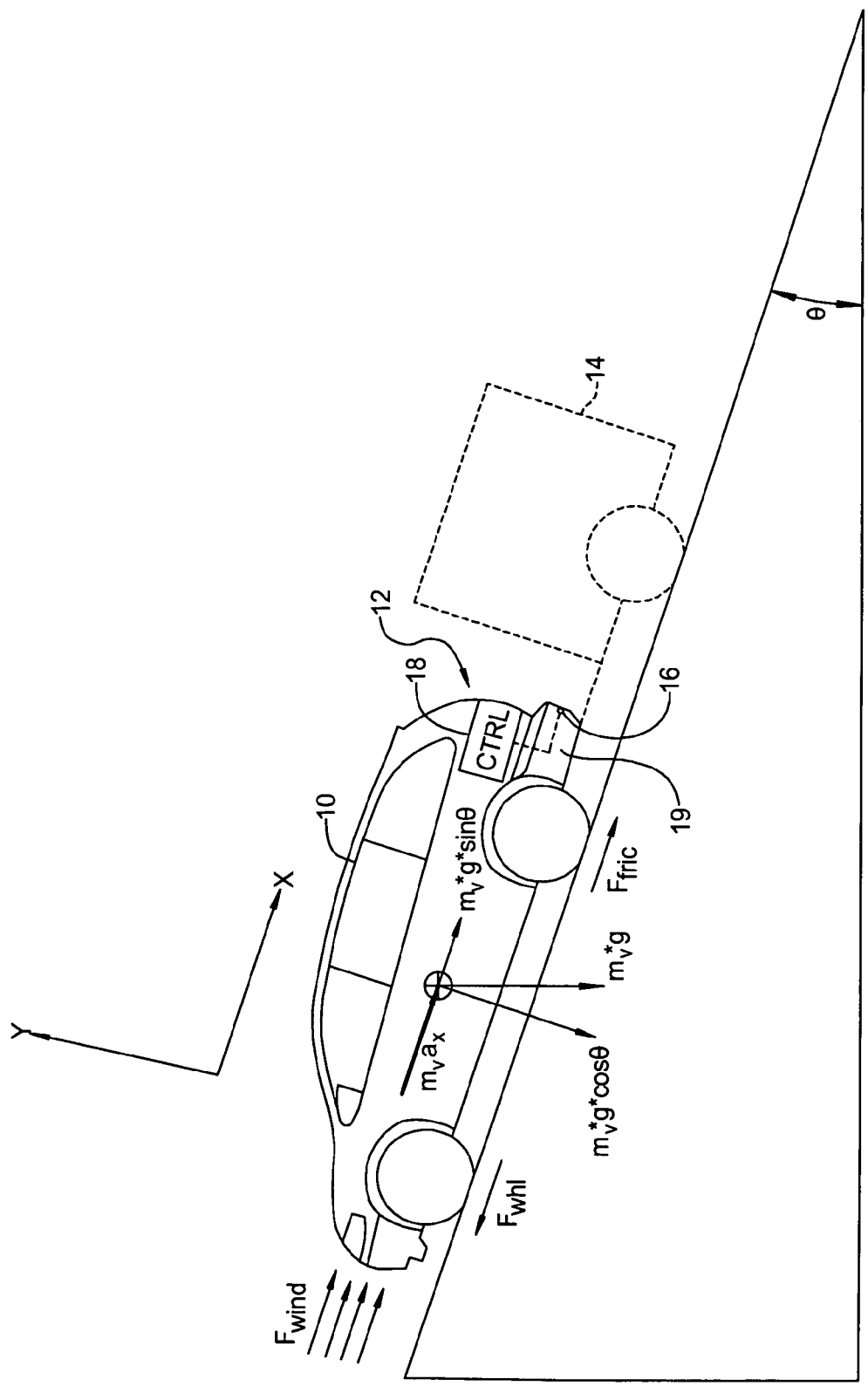
FIG. 2 is a side view of a vehicle with an object being towed and with various vehicle loads represented.

Referring now to FIGS. 1 and 2, a vehicle 10 equipped with a towing load detection system 12 is illustrated. The towing load detection system 12 is operable to detect whether the vehicle 10 is towing an object 14, such as a trailer, boat, and the like (shown in phantom).

In the embodiment shown, the towing load detection system 12 includes at least one, and preferably a plurality of proximity sensors 16 operable to detect the presence of the object 14. In the embodiment shown in FIG. 1, the proximity sensors 16 are mounted to the rear bumper 19 of the vehicle 10. In one embodiment, the proximity sensors 16 are each acoustic proximity sensors. The towing load detection system 12 also includes a controller schematically illustrated at 18. The controller 18 can be associated with the vehicle's onboard computer. The controller 18 is in communication with the proximity sensors 16. Thus, to detect whether the vehicle 10 is towing an object 14, the proximity sensors 16 emit an ultrasonic signal from the rear of the vehicle. If the vehicle 10 is towing an object 14, the ultrasonic signals will reflect off of the object 14 back toward the proximity sensors 16. Upon receiving the reflected ultrasonic signal, the proximity sensors 16 will send a correlative signal to the controller 18. If the vehicle 10 is not towing an object 14, the ultrasonic signal emitted from the proximity sensors 16 will not reflect back to the proximity sensors 16, thereby indicating that the vehicle 10 is not towing an object 14.

When the towing load detection system 12 detects that the vehicle 10 is towing an object 14, the controller 18 can automatically cause a vehicle effect that allows the vehicle 10 to perform more appropriately for towing. For example, the controller 18 can regulate the transmission of the vehicle 10 as a result of the detection of the towed object 14. As such, the controller 18 can cause the transmission to remain in a lower gear when ascending a hill such that more torque is delivered to the wheels of the vehicle 10. Likewise, the controller 18 can cause the transmission to remain in a lower gear when descending a hill such that engine braking occurs. In one embodiment, the controller 18 automatically controls the cooling system of the vehicle 10 as a result of the detection of the towed object 14. More specifically, the controller 18 can cause cooling fans to automatically operate, thereby cooling the engine or other components more effectively. The controller 18 could also cause coolant oils to be injected into the engine for more effective cooling. In one embodiment, the controller 18 can also cause a towing indicator to turn on. For example, the towing indicator could be a visible light or message that is readable by the driver to indicate that the vehicle 10 is towing the object 14. In one embodiment, the towing indicator is data that is stored in the vehicle's computer memory that indicates the vehicle 10 is being used for towing. As such, the towing indicator data stored in memory can be used to determine whether the vehicle 10 was used in a manner that falls outside the scope of warranty coverage for the vehicle 10. Those having ordinary skill in the art will appreciate that the controller 18 could cause any one of these vehicle effects, a combination of these vehicle effects, or any other vehicle effect without departing from the scope of the invention.

In one embodiment, the towing load detection system 12 also includes a timer apparatus 20. The timer apparatus 20 is generally operable to measure the amount of time that the proximity sensors 16 detect the presence of the object 14. When the proximity sensors 16 detect the presence of the object 14 for a predetermined amount of time (e.g., 5 seconds), the controller 18 then begins to automatically regulate the transmission, control the cooling system, indicate towing, or otherwise effect the vehicle in a manner discussed above. If the proximity sensors 16 detect the presence of the object 14 for less than the predetermined amount of time, the controller 18 does not cause the vehicle effect, and the vehicle 10 operates normally. As a result, the towing load detection system 12 can more accurately determine that an object 14 is actually being towed by the vehicle.

In one embodiment, the timer apparatus 20 incrementally increases toward a threshold amount of time when the presence of the object 14 is detected, and the timer apparatus 20 incrementally decreases away from the threshold amount of time when no object is detected. The controller 18 causes the vehicle effect once the timer apparatus 20 reaches the threshold amount of time. For example, if it is determined that the controller 18 is to cause the vehicle effect only after the proximity sensors 16 detect the object 14 for five seconds, then five seconds is deemed the "threshold amount of time." If the sensors 16 detect the object 14 for three seconds, then the timer apparatus 20 increases by three seconds. If the object 14 then swings to the side of the vehicle 10 and goes undetected by the proximity sensors 16 for two seconds, the timer apparatus 20 decreases by two seconds. Only when the object 14 is detected by the proximity sensors 16 for four more seconds will the timer apparatus 20 reach the threshold amount of time of five seconds. Then the controller 18 will cause the vehicle effect of transmission regulation, cooling system control, towing indication, or otherwise. As such, the timer 20 allows the towing load detection system 12 to more accurately determine whether an object 14 is being towed.

In one embodiment, the towing load detection system 12 includes a microprocessor 24. The microprocessor 24 is operable to calculate whether the vehicle 10 is subject to an increased load. More specifically, the microprocessor 24 calculates whether the output of the vehicle (e.g., vehicle acceleration, etc.) is less than expected given the input supplied by the engine and other factors. If the output is less than expected, then the towing load detection system 12 detects an increased load on the vehicle.

For example, in FIG. 2 the vehicle 10 is shown on an incline represented by the angle $\theta$. The primary forces (the weight of the vehicle, the force of friction, $F_{fric}$, the force of the wheels, $F_{whl}$, and the force of the wind, $F_{wind}$) are also represented in FIG. 2. It is known that:

$$\Sigma F_x = m_v a_x$$

More specifically:

$$m_v g \sin \theta + F_{fric} + F_{wind} - F_{whl} + m_v a_x = 0$$

Solving for sin $\theta$, the equation becomes:

$$\sin \theta = \frac{F_{whl} - F_{fric} - F_{wind} - m_v a_x}{m_v g}$$

Because the angle of incline, $\theta$, is relatively small, it can be assumed that sin $\theta$ equals $\theta$ (measured in radians). Thus:

$$\theta = \frac{F_{whl} - F_{fric} - F_{wind} - m_v a_x}{m_v g}$$

The force on the wheels, $F_{whl}$, is a known quantity calculated with the following equation:

$$F_{whl} = \frac{(\text{Engine Torque})(\text{Gear Ratio})(\text{Final Drive Ratio})}{(\text{Tire Radius})\eta}$$

where $\eta$ is the driveline efficiency.

The force of friction, $F_{fric}$, is also a known quantity calculated with the following equation:

$$F_{fric} = \mu(m_v)(\cos \theta)$$

where $\mu$ is the coefficient of rolling friction and where cos $\theta$ is assumed to be equal to one (1) since $\theta$ is relatively small.

Furthermore, the force of the wind, $F_{wind}$, is a known quantity calculated with the following equation:

$$F_{wind} = \tfrac{1}{2}(C_d)(\rho)(A)(V)^2$$

where $C_d$ is the vehicle drag coefficient, $\rho$ is the density of air, A is the frontal area of the vehicle and V is the measured velocity of the vehicle.

Once the microprocessor 24 calculates the value of $\theta$, the value of $\theta$ is analyzed. If $\theta$ is equal to approximately zero, then it is deduced that the vehicle is in an equilibrium condition. However, if $\theta$ is not equal to approximately zero, then it is deduced that the vehicle 10 is subject to an increased vehicle load. This increased vehicle load could be due to several things. For example, the vehicle load increase could be an increased aerodynamic load due to a strong headwind. The vehicle load increase could also be due to increased friction with the road surface. The vehicle load increase could also be due to an increase in the grade of the road surface. Furthermore, the vehicle load increase could be due to the load of an object 14 being towed by the vehicle 10.

To distinguish between these conditions and to determine the nature of the increased load (i.e., an increased value of $\theta$), the towing load detection system 12 utilizes the proximity sensors 16. If the microprocessor 24 calculates an increase in $\theta$, but the proximity sensors 16 do not detect an object 14 being towed by the vehicle 10, then it is determined that the vehicle 10 is not towing an object 14. However, if the microprocessor 24 calculates an increase in $\theta$, and the proximity sensors 16 detect an object 14 being towed by the vehicle 10, it is confirmed that the vehicle 10 is towing the object 14, and the controller 18 can cause any one of the vehicle effects described above, such as transmission regulation, cooling system control, towing indication, or otherwise. Accordingly, the towing load detection system 12 allows the vehicle 10 to operate more effectively when towing an object 14. Also, the towing load detection system 12 distinguishes increased vehicle loads caused by a tow load from increased vehicle loads caused by headwinds, increased grade, increased friction, or otherwise. As such, the towing load detection system is unlikely to falsely identify an increased load as a tow load.

Turning now to FIG. 3, a flowchart is shown which demonstrates one embodiment of the operation of the towing load detection system 12. The method 26 begins in starting block 28, and in step 30 it is determined whether a vehicle load increase is detected using the calculations of the microprocessor 24 described above. If no vehicle load increase is seen, the method 26 reverts back to the starting block 28. However, if a vehicle load increase is detected due to the calculations of the microprocessor 24, the method 26 moves to step 32, in which in the proximity sensors 16 are utilized as described above to detect whether the towing object 14 is present. Then, in step 34 it is determined whether the towing load is detected for an amount of time at or above a predetermined threshold as described above. If the towing load is not detected for this predetermined amount of time, then the method 26 continues to look for a towing load with the proximity sensors 16 in step 32. However, if the towing load is detected for the predetermined amount of time, the method moves to step 36 in which the controller 18 causes any one or more of the vehicle effects, such as transmission regulation, cooling system control, towing indication, or otherwise. Then, the method 26 ends in block 38.

In summary, the towing load detection system 12 automatically controls the vehicle 10 to operate in an appropriate manner when the vehicle 10 is towing an object 14. However, because the towing load detection system 12 calculates an increase in vehicle load and then confirms that an object 14 is present with the proximity sensors 16, the towing load detection system 12 distinguishes a towing condition from other conditions that could have caused the increased vehicle load. As such, the vehicle 10 is automatically controlled during towing conditions, but the vehicle 10 is not controlled in this manner when the vehicle 10 is not towing an object 14.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A towing load detection system for distinguishing a condition of towing an object from another condition comprising:
    a controller that determines an expected output of a vehicle based on a known input to the vehicle, the controller also detecting an actual output of the vehicle, the controller further detecting whether the actual output of the vehicle is less than the expected output of the vehicle, the controller determining that the vehicle is subject to an increased load when the actual output of the vehicle is less than the expected output of the vehicle; and
    at least one proximity sensor operable to detect a presence of the object;
    wherein the controller determines that the increased load is at least partially caused by the object when the at least one proximity sensor detects the presence of the object and determines that the increased load is caused otherwise when the at least one proximity sensor fails to detect the presence of the object, the controller being further operable to cause a vehicle effect when the controller determines that the increased load is at least partially caused by the object.

2. The towing load detection system of claim 1 wherein the at least one proximity sensor is an acoustic proximity sensor.

3. The towing load detection system of claim 1 further comprising a timer apparatus operable to measure an amount of time that the at least one proximity sensor detects the presence of the object, and wherein the controller causes the vehicle effect once the at least one proximity sensor has detected the presence of the object for a predetermined amount of time.

4. The towing load detection system of claim 3, wherein the timer apparatus increases toward a threshold amount of time when the presence of the object is detected and wherein the timer apparatus decreases away from the threshold amount of time when the object is undetected, and wherein the controller causes the vehicle effect once the timer apparatus reaches the threshold amount of time.

5. The towing load detection system of claim 1, wherein the vehicle effect caused by the controller is chosen from a group consisting of transmission regulation, cooling system control, towing indication, and a combination thereof.

6. The towing load detection system of claim 1, wherein the at least one proximity sensor is operable to detect the presence of the object depending on a proximity of the object relative to the vehicle.

7. A vehicle comprising:
    a controller that determines an expected output of the vehicle based on a known input to the vehicle, the controller also detecting an actual output of the vehicle, the controller further detecting whether the actual output of the vehicle is less than the expected output of the vehicle, the controller determining that the vehicle is subject to an increased load when the actual output of the vehicle is less than the expected output of the vehicle; and
    at least one proximity sensor operable to detect a presence of an object being towed by the vehicle;
    wherein the controller determines that the increased load is at least partially caused by the object when the at least one proximity sensor detects the presence of the object and determines that the increased load is caused otherwise when the at least one proximity sensor fails to detect the presence of the object, the controller being further operable to cause a vehicle effect when the controller determines that the increased load is at least partially caused by the object.

8. The vehicle of claim 7 further comprising a bumper and wherein the at least one proximity sensor is mounted to the bumper.

9. The vehicle of claim 7 wherein the at least one proximity sensor is an acoustic proximity sensor.

10. The vehicle of claim 7 further comprising a timer apparatus operable to measure an amount of time that the at least one proximity sensor detects the presence of the object, and wherein the controller causes the vehicle effect once the at least one proximity sensor has detected the presence of the object for a predetermined amount of time.

11. The vehicle of claim 10, wherein the timer apparatus increases toward a threshold amount of time when the presence of the object is detected and wherein the timer apparatus decreases away from the threshold amount of time when the object is undetected, and wherein the controller causes the vehicle effect once the timer apparatus reaches the threshold amount of time.

12. The vehicle of claim 7, wherein the vehicle effect caused by the controller is chosen from a group consisting of transmission regulation, cooling system control, towing indication, and a combination thereof.

13. A method of distinguishing a condition of towing an object from another condition, the method comprising:
    determining an expected output of the vehicle based on a known input to a vehicle;

detecting an actual output of the vehicle;

determining that the vehicle is subject to an increased load when the actual output of the vehicle is less than the expected output of the vehicle;

detecting with at least one proximity sensor whether the vehicle is towing the object;

determining that the increased load is at least partially caused by the object when the at least one proximity sensor detects the object and determining that the increased load is caused otherwise when the at least one proximity sensor fails to detect the object; and causing a vehicle effect when it is determined that the increased load is at least partially caused by the object.

14. The method of claim 13 wherein the at least one proximity sensor is an acoustic proximity sensor.

15. The method of claim 13, further comprising the steps of measuring an amount of time that the at least one proximity sensor detects the presence of the tow object, and wherein the step of causing the vehicle effect occurs once the at least one proximity sensor detects the presence of the object for a predetermined amount of time.

16. The method of claim 15, further comprising the steps of increasing a timer apparatus toward a threshold amount of time when the presence of the object is detected, decreasing the timer apparatus away from the threshold amount of time when the object is undetected, and causing the vehicle effect when the timer apparatus reaches the threshold amount of time.

17. The method of claim 13, wherein the step of causing a vehicle effect comprises at least one of regulating a transmission of the vehicle, controlling a cooling system of the vehicle, and indicating that the object is being towed.

18. The method of claim 13, wherein the determining that the vehicle is subject to an increased load comprises calculating θ according to:

$$\theta = \frac{F_{whl} - F_{fric} - F_{wind} - m_v a_x}{m_v g}$$

wherein $F_{whl}$ is a force on a wheel of the vehicle, $F_{fric}$ is a force of friction on the vehicle, $F_{wind}$ is a force of wind on the vehicle, $m_v$ is a mass of the vehicle, $a_x$ is an acceleration of the vehicle, and g is an acceleration due to gravity, and wherein the determining that the vehicle is subject to an increased load comprises calculating θ as a non-zero value.

* * * * *